United States Patent
Bellhouse

(10) Patent No.: US 6,217,764 B1
(45) Date of Patent: Apr. 17, 2001

(54) FILTER COMPRISING ONE OR MORE DUCTS

(75) Inventor: Brian John Bellhouse, Oxfordshire (GB)

(73) Assignee: Isis Innovation Limited, Oxford (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/913,267

(22) PCT Filed: Mar. 11, 1996

(86) PCT No.: PCT/GB96/00584

§ 371 Date: Sep. 9, 1997

§ 102(e) Date: Sep. 9, 1997

(87) PCT Pub. No.: WO96/28241

PCT Pub. Date: Sep. 19, 1996

(30) Foreign Application Priority Data

Mar. 10, 1995 (GB) .................................. 9504908

(51) Int. Cl.[7] .......................... B01D 63/06; B01D 65/08
(52) U.S. Cl. .................. 210/321.69; 210/321.8; 210/321.89; 210/490; 210/496; 210/510.1; 264/DIG. 48
(58) Field of Search ............. 210/321.74, 321.83, 210/493.4, 497.1, 510.1, 321.69, 321.81, 321.9, 490, 433.1, 496, 321.78, 321.79, 321.8, 321.87, 321.88, 321.89, 323.2, 332; 55/523, 524; 264/DIG. 48

(56) References Cited

U.S. PATENT DOCUMENTS

| | | | |
|---|---|---|---|
| 3,219,193 | * 11/1965 | Techler | 210/497.1 |
| 3,676,193 | 7/1972 | Cooper et al. | |
| 4,069,157 | 1/1978 | Hoover et al. | |
| 4,640,774 | * 2/1987 | Garcera | |
| 4,921,607 | * 5/1990 | Langley | 210/510.1 |
| 5,006,229 | * 4/1991 | Espenan | |
| 5,008,012 | * 4/1991 | Hagihara et al. | 210/433.1 |
| 5,186,834 | * 2/1993 | Arai | 210/497.1 |
| 5,442,968 | * 8/1995 | Westlake, III et al. | 210/321.74 |
| 5,490,926 | * 2/1996 | Hammeken | 210/321.74 |

FOREIGN PATENT DOCUMENTS

| | | | |
|---|---|---|---|
| 0 375 481 | 6/1990 | (EP) . | |
| 2 566 282 | 12/1985 | (FR) . | |
| 2 223 690 | 4/1990 | (GB) . | |
| 2223690 | * 4/1990 | (GB) | 210/490 |
| 62-57608 | 3/1987 | (JP) . | |
| 63-65908 | 3/1988 | (JP) . | |
| PCT/GB94/ 00561 | 9/1994 | (WO) . | |

* cited by examiner

*Primary Examiner*—Matthew O. Savage
(74) *Attorney, Agent, or Firm*—Baker & Daniels

(57) ABSTRACT

A membrane filter having one or more ducts is disclosed herein. Each of the ducts has a porous wall defining a lumen surrounded by helical grooves in the respective wall. The groove can be a single, double, or triple start groove defining a flow direction along the groove. The cross sectional area of the groove in the case of a single start groove, or aggregate cross sectional area of the groove in the case of a double or triple start groove, perpendicular to the flow direction along the lumen is within a range of 75% to 125% of the cross sectional area of the lumen. The helical grooves create vortices which reduce concentration polarization while increasing membrane area.

18 Claims, 3 Drawing Sheets

FILTER COMPRISING ONE OR MORE DUCTS

This invention relates to filters, particularly, though not exclusively, for medium-scale applications such as water purification or food processing.

In my earlier WO 94/21362, I disclosed a way of enhancing the performance of tubular membrane filters by introducing helical flow deflectors to induce fluid mixing in the radial direction. One of the examples disclosed in the application is of a rod with a helical groove inserted concentrically within a tubular filtration membrane. Steady feed flow in the annular space between the impermeable helical insert and the concentric tubular permeable membrane provides excellent radial mixing. In a second example, the tubular filtration membrane lies concentrically inside a casing containing a helical groove. Flow patterns are created within the annular space between the impermeable casing and the cylindrical permeable membrane, which ensure high filtration performance and good mixing which prevents concentration polarisation. Both of these examples work well with a polymeric, permeable, membrane tube of diameter 12.5 mm, but it is difficult to scale up these apparatuses to provide membrane areas of the order of 1 to 10 m² for larger applications without resorting to bulky and expensive filter units.

Filters which have a large membrane area packed into a small volume for larger applications are available commercially. One such filter provides a large number of parallel capillaries, in a highly porous block of support material such as a ceramic, with a much tighter porous layer at the wall of each capillary. The manifolding of the capillaries for feed fluid entry and exit is provided by the porous block. Filtrate passes through the capillary walls and then through the highly porous block. The filtrate is then collected in suitable channels at the outer surface of the porous block (FIG. 1). However, it is necessary to pump the feed flow through each capillary at velocities as high as 6 m/s in order to achieve reasonable mixing by turbulent flow and hence adequate filtration performance. Although this design is space-saving it requires very high flow rates, and hence pumping costs (both capital and running) are correspondingly high. Furthermore, damage to delicate components in the feed fluid, caused by turbulent flow is an additional disadvantage of this particular method.

One way of reducing the feed flow rate would be to place helical inserts in each tubular capillary in the porous ceramic block in a similar manner to that used in WO 94/21362. However, these capillaries generally have a diameter of 4 mm of less, and it is difficult to construct helical inserts of suitable geometry which are sufficiently robust and which are sufficiently rigid to avoid vibration and consequent damage to the capillary walls.

GB-A-2223690 discloses a filter comprising one or more substantially unobstructed ducts with porous walls, the or each duct having a helical groove in the wall; and, according to the present invention, such a filter is characterised in that the groove is a single-, double- or triple-start groove and the cross sectional area, or aggregate cross sectional area, of the groove, perpendicular to flow along the groove, is similar (as herein defined) to the cross sectional area of the lumen.

Unlike the prior art in which the porous membrane was of a cylindrical shape, the porous surface in this invention is of a helical shape. The helically grooved ducts thus provide excellent radial mixing and hence prevent concentration polarisation, but also provide increased membrane area, compared with conventional permeable membranes of circular cross-section. The present invention also avoids the high pumping costs of the prior art filter and the difficulty and expense of constructing helical inserts which cause vibration and damage to cylindrical membrane walls.

The duct(s) is (are) preferably in a porous block of support material, and a denser porous surface may be formed at the wall(s) of the duct(s).

The porous block lends itself to the convenient formation of a large member of ducts therein to create a large membrane area in a small volume for more efficient filtering. The filtrate can also be conveniently collected in a chamber or chambers at the outer surface of the porous block.

In use, the core-flow is through the central lumen of the duct with a helical flow along the duct wall which produces a vortex within the helical groove (FIG. 4). Similar flow patterns are described in my WO 94/21362 except, of course, in the present invention the feed flow is into an open tube rather than into an annular space.

The helical groove may be single-start, or may be double- or triple-start, in order to reduce pressure drop along the ducts. Double-start helical grooves reduce the pressure drop along the duct by a factor of four and triple-start helical grooves reduce the pressure drop by a factor of nine when compared with a corresponding duct with a single-start helical groove, without compromising radial mixing. This is achieved because of the reduced length of each groove and the increased total number of sub grooves.

The lumen of the duct may be up to 20 mm in diameter, but is preferably between 3 and 5 mm in diameter with adjacent turns separated by a land, eg, substantially 1 mm wide.

Experiments have shown that the cross sectional area, perpendicular to the direction of flow along the helical groove, or the aggregate cross sectional area in the case of a multi-start groove, should be similar to the cross sectional area of the central cylindrical lumen. By similar is meant that the groove cross sectional area is within plus or minus 25%, and preferably within plus or minus 10%, of the lumen cross sectional area.

As seen in cross section perpendicular to the flow along the groove, the peripheral wall of the groove should be arcuate to promote a smooth flow pattern and an appropriate cross sectional shape is semi circular. Thus in the case of a groove cross section of semi circular shape, and applying the preferred requirement that the groove cross sectional area or aggregate cross sectional area is the same as that of the lumen, then if the diameter of the semi circular cross section of the groove is c and the diameter of the lumen is d:

$$n \cdot \frac{(\pi c^2)}{8} = \frac{\pi d^2}{4}$$

when n is the number of groove starts.

Hence $nc^2 = 2d^2$.

Thus for a single-start:

$$c = \sqrt{\sqrt{2}}d$$

for a double-start:

$$c = d$$

for a triple-start:

$$c = \sqrt{2/3}d$$

Thus if d=4 mm:

When n=1, c=5.6 mm and the groove depth is 2.83 mm.

When n=2, c=4 mm and the groove depth is 2 mm.

When n=3, c=3.28 mm and the groove depth is 1.64 mm.

Figure 2:
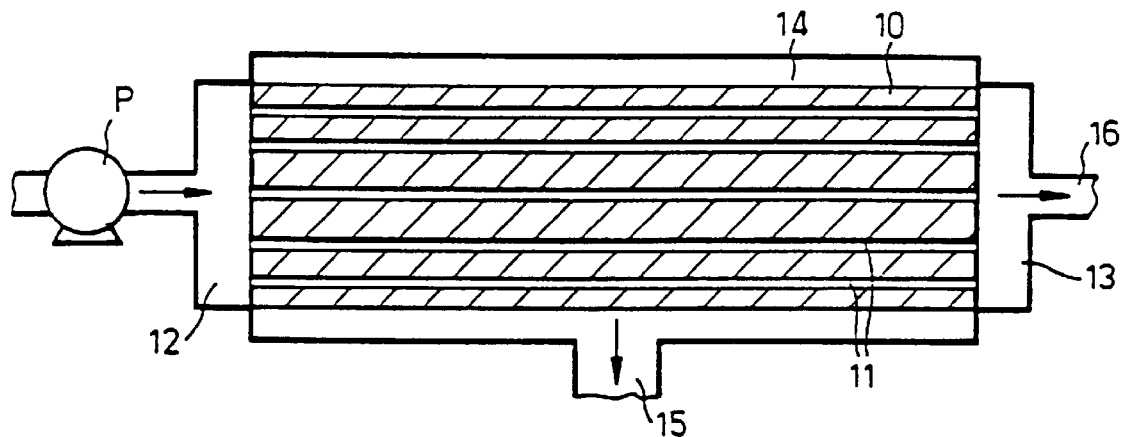
FIG. 2 is a diagrammatic representation of how the filter may be used.

As shown in FIG. 2, a porous block 10 of sintered material is formed with a number of longitudinal ducts 11. At an upstream end of the block these ducts open into an inlet manifold 12 and, at the downstream end, into an outlet manifold 13. The block is surrounded by an annular chamber 14 having an outlet 15. In use a fluid to be filtered is forced by a pump P into the inlet manifold 12 and hence through the ducts 11. The filtrate passes out through the walls of the ducts and percolates through the pores in the block 10 until it reaches the chamber 14, from which it is recovered through the outlet 15. The concentrate of the filtration passes into the outlet manifold 13 and hence through an outlet 16.

Figure 1:
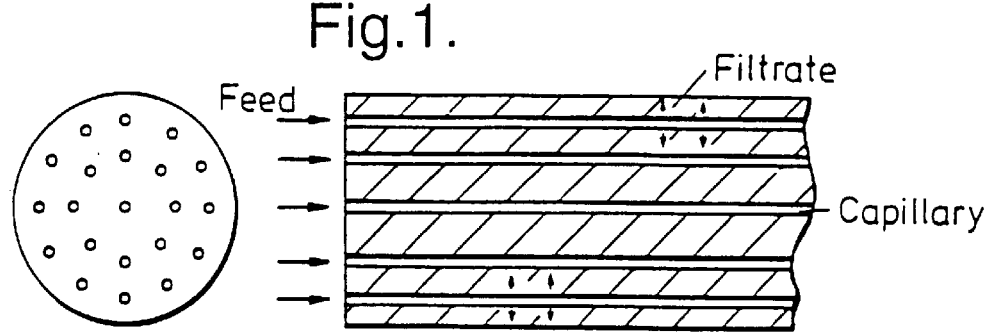
FIG. 1 is an example of a porous ceramic block containing capillaries according to the prior art.
Figure 3:
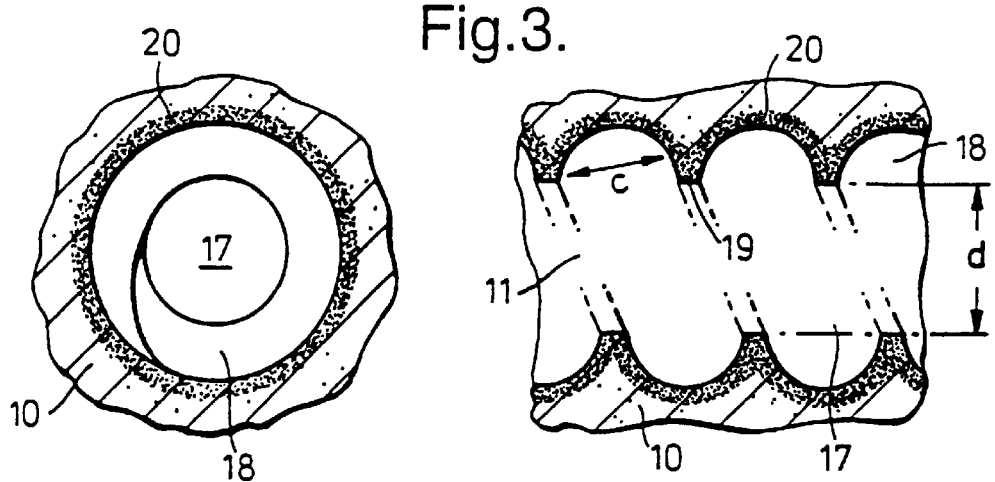
FIG. 3 is an axial section showing diagrammatically the typical geometry of a duct according to the present invention.
Figure 4:
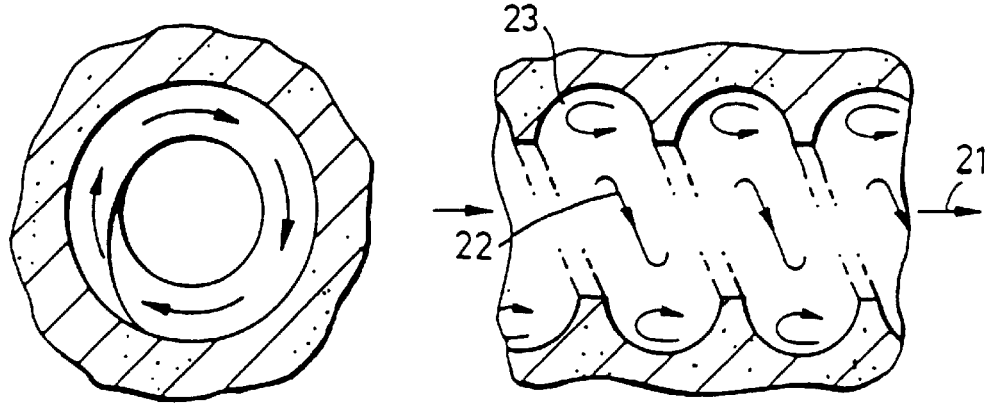
FIG. 4 illustrates the flow patterns present in the duct of FIG. 3.

FIGS. 3 and 4 show the internal geometry of a duct 11. This is shown as having a cylindrical lumen 17 surrounded by a single-start helical groove 18 of substantially semicircular cross-section, with adjacent turns separated by a land 19.

As described elsewhere, the wall of the duct may have a layer 20 of more dense porous material.

The secondary flow patterns produced when the duct is in use are shown in FIG. 4. Core flow 21 is through the lumen with the helical flow 22 around the groove producing vortices 23, ensuring good mixing and high filtration performance.

Figure 5:
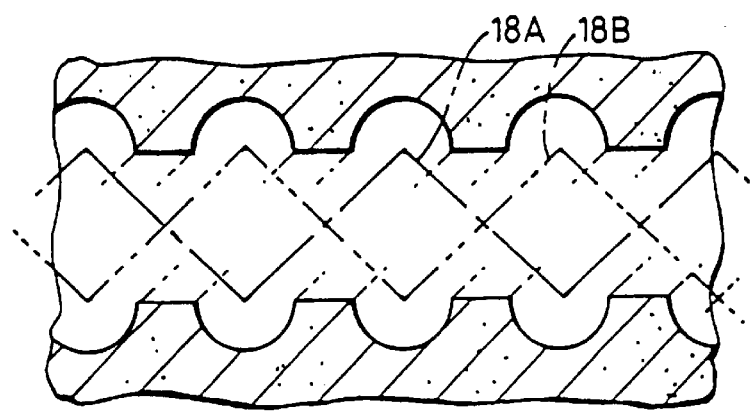
FIG. 5 is a diagrammatic axial section of a duct having a double-start groove.
Figure 6:
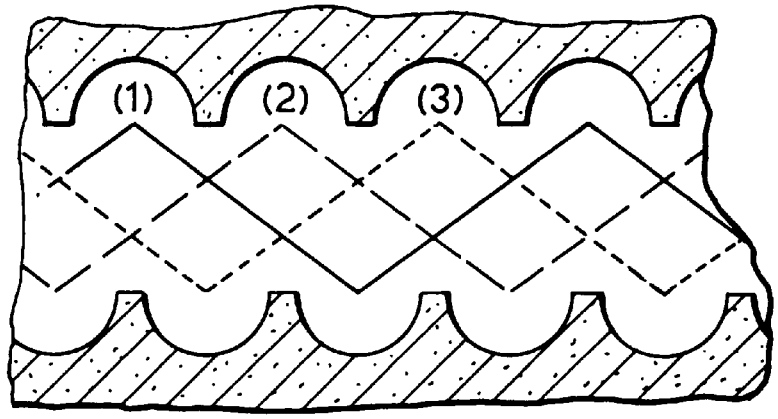
FIG. 6 is a diagrammatic axial section of a duct having a triple-start groove.

FIG. 5 shows a modification of the duct of FIG. 3, in which there is a double-start groove 18(A) and 18(B), and FIG. 6 shows a duct having a triple-start groove;

The porous blocks with helically grooved ducts within them could be made by a technique adapted from the well-known process for making ceramic filters with cylindrical capillaries according to the prior art.

Figure 7:
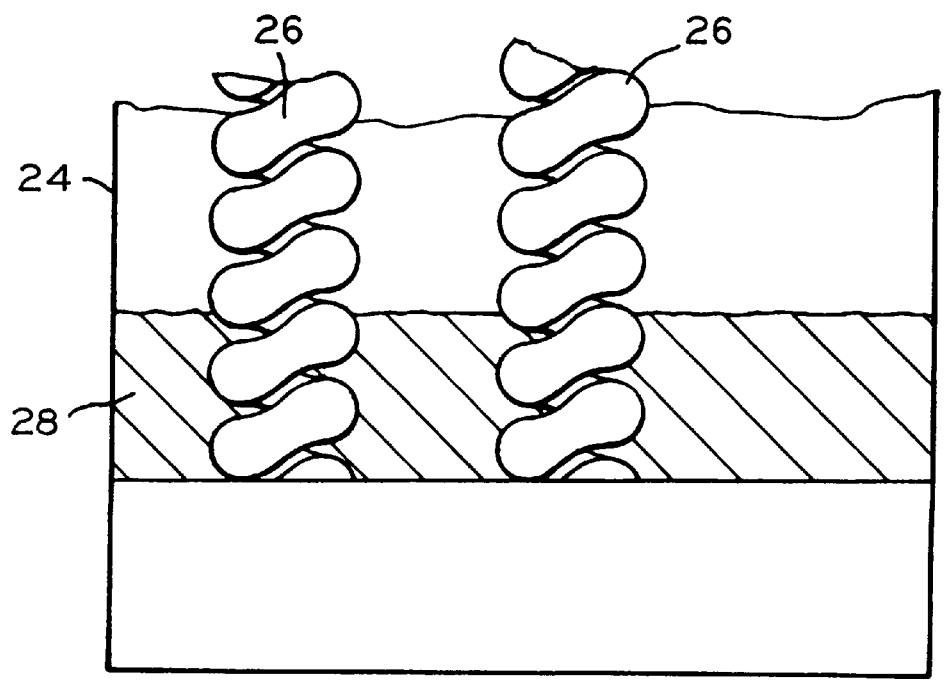
FIG. 7 illustrates the method of making a filter in accordance with the present invention.

In this process, and with reference to FIG. 7, a tubular metal container 24 has the required number of duct defining rods 26 fixed within it. The duct defining rods of the present invention have helical formations projecting therefrom and are screwed into the top and bottom end plates of the metal container. Particulate clay 28 in dry or slurry form or glass or other ceramic or polymeric material is introduced into the space between the duct defining rods 26. When filled, the container is heated in an oven to the temperature required to fire the clay or other porous material. When the fired block has cooled, the duct defining rods 26 are unscrewed from the porous block and the block is retracted from the metal container. The duct defining rods 26 and/or the metal container 24 may be slightly tapered to improve release.

A denser porous surface may then be applied to the walls of the ducts. This can be done using a slurry of clay or other particles of much smaller size than those used to make the highly porous block. Dip-coating, spin-coating or slip-coating techniques are familiar to ceramic and polymeric membrane manufacturers, any of which could be used to apply the tighter membrane surface. The pores produced should have a diameter of about 0.2 $\mu$m for micro filtration, 0.02 $\mu$m for ultra filtration or 0.002 $\mu$m for nano filtration.

All three types of pore size are useful in food and water processing. Dye processing would use mainly nano filtration. Ceramic materials can be cleaned with aggressive chemicals and can be steam sterilised, both important advantages for food or water processing.

An alternative method of manufacture would be to extrude ceramic tubes with helical geometry. These could be extruded singly and then assembled in parallel into a stack. Alternatively, they could be co-extruded with rotating extruder heads.

As an alternative to ceramic or sintered materials, it should be possible to inject open pore structural foam materials, such as polyurethane, to form the porous block. Dip-coating of the tubular walls with polymeric solutions, preferably prior to injection of the structural foam, provides the selective membrane surfaces. Pore size is often controlled either by dissolving particulates such as salt or by solvent exchange (also known as phase inversion).

In the production of polymeric membranes it is often possible to provide a skinned, or asymmetric structure, with the skin forming at a solid surface, such as the surface of the duct-defining metal rods used in the present invention. Thus it should be possible to form the whole block with a single injection of polymeric open-pored foam. Although polymer foams would be difficult to clean and sterilise they may offer big savings in cost, compared to ceramic membranes.

What is claimed is:

1. A filter comprising one or more substantially unobstructed ducts (11), each said duct having a porous wall defining a lumen surrounded by a helical groove in the respective wall; wherein the groove is a single-, double- or triple-start groove defining a flow direction along the groove; and a cross sectional area of the groove in the case of a single-start groove, or aggregate cross sectional area of the groove in the case of a double or triple-start groove, perpendicular to the flow direction along the groove (18), is within a range of 75% to 125% of the cross sectional area of the lumen (17).

2. A filter according to claim 1, wherein said one or more substantially unobstructed ducts are in a porous block (10) of support material.

3. A filter according to claim 2, wherein a denser porous surface (20) is formed at the walls of the duct(s).

4. A filter according to claim 2 or claim 3, comprising means defining at least one chamber (14) at the outer surface of the porous block for collecting the filtrate.

5. A filter according to claim 2 wherein the helical groove (18) is of substantially semi-circular cross-section.

6. A filter according to claim 3 wherein the helical groove (18) is of substantially semi-circular cross-section.

7. A method of making a filter according to claim 3, the method comprising providing a container with a plurality of duct-defining rods fixed within it, the duct-defining rods having helical formations projecting therefrom; introducing material into space between the duct-defining rods; forming the material into a porous block; and removing the duct-defining rods and container from the porous block.

8. A filter according to claim 1, wherein the lumen (17) of the duct is up to 20 mm in diameter.

9. A filter according to claim 8, wherein the lumen (17) is between 3 and 5 mm in diameter.

10. A filter according to claim 9 wherein the helical groove (18) is of substantially semi-circular cross-section.

11. A filter according to claim 8 wherein the helical groove (18) is of substantially semi-circular cross-section.

12. A filter according to claim 1, wherein the helical groove (18) is of substantially semi-circular cross-section.

13. A method of making a filter according to claim 12, the method comprising providing a container with a plurality of duct-defining rods fixed within it, the duct-defining rods having helical formations projecting therefrom; introducing material into space between the duct-defining rods and container from the porous block.

14. A method of making a filter according to claim 1, the method comprising providing a container with a plurality of duct-defining rods fixed within it, the duct-defining rods having helical formations projecting therefrom; introducing material into space between the duct-defining rods; forming the material into a porous block; and removing the duct-defining rods and container from the porous block.

15. A method according to claim 14, further comprising forming a denser porous surface at walls of the ducts.

16. A filter according to claim 1 wherein the cross-sectional area, or aggregate cross-sectional area, of the groove in the case of a double or triple-start groove, perpendicular to the flow direction along the groove (18), is within a range of 90% to 110% of the cross-sectional area of the lumen (17).

17. A method of making a filter according to claim 16, the method comprising providing a container with a plurality of duct-defining rods fixed within it, the duct-defining rods having helical formations projecting therefrom; introducing material into space between the duct-defining rods; forming the material into a porous block; and removing the duct-defining rods and container from the porous block.

18. A filter to claim 16, wherein the helical groove (18) is of substantially semi-circular cross-section.

* * * * *